United States Patent
Palaniappan

(10) Patent No.: US 8,352,514 B2
(45) Date of Patent: Jan. 8, 2013

(54) ASSOCIATION AND EXTRACTION OF CONTENT ARTIFACTS FROM A GRAPHICAL REPRESENTATION OF ELECTRONIC CONTENT

(75) Inventor: Murugan Palaniappan, Saratoga, CA (US)

(73) Assignee: CK12 Foundation, Palo Alto, CA (US)

( * ) Notice: Subject to any disclaimer, the term of this patent is extended or adjusted under 35 U.S.C. 154(b) by 429 days.

(21) Appl. No.: 12/629,026

(22) Filed: Dec. 1, 2009

(65) Prior Publication Data
US 2010/0145984 A1    Jun. 10, 2010

Related U.S. Application Data

(60) Provisional application No. 61/121,188, filed on Dec. 10, 2008.

(51) Int. Cl.
*G06F 7/00* (2006.01)
*G06F 17/30* (2006.01)
(52) U.S. Cl. ......... 707/805; 707/769; 434/336; 434/362
(58) Field of Classification Search .................. None
See application file for complete search history.

(56) References Cited

U.S. PATENT DOCUMENTS

| 7,014,467 B2 | 3/2006 | Krebs et al. | |
|---|---|---|---|
| 2003/0039949 A1* | 2/2003 | Cappellucci et al. | 434/362 |
| 2004/0152062 A1* | 8/2004 | Adams | 434/336 |
| 2005/0004789 A1* | 1/2005 | Summers | 703/22 |
| 2007/0112703 A1* | 5/2007 | Gu et al. | 706/20 |

\* cited by examiner

*Primary Examiner* — Loan T Nguyen
(74) *Attorney, Agent, or Firm* — Ash Tankha; Lipton, Weinberger & Husick

(57) ABSTRACT

A computer implemented method and system is provided for associating and extracting content artifacts from a graphical representation of electronic content. A multi-dimensional virtual lattice comprising one or more grid layers is created. The nodes of the multi-dimensional virtual lattice represent metadata acquired from predefined content criteria. Electronic content comprising content artifacts acquired from multiple content sources is graphically represented within the multi-dimensional virtual lattice using the grid layers. Each of the content artifacts from the electronic content attaches to one or more nodes of the multi-dimensional virtual lattice. A user provides search criteria comprising keywords. The content artifacts attached to nodes of the multi-dimensional virtual lattice whose metadata matches with the keywords are extracted and displayed to the user. The graphical representation of electronic content in the multi-dimensional virtual lattice is used to associate, extract, composite, project, and organize the content artifacts acquired from the content sources.

17 Claims, 14 Drawing Sheets

| | | SUPER USER | WELCOME, ADMIN | PROFILE | LOGOUT | HELP |
|---|---|---|---|---|---|---|
| HOME | BROWSE | MY LIBRARY | PRINT CENTER ✎ ADMIN | PHYSICS | GO | ADVANCED |
| △ | FLEXBOOK EDITOR | SAVE | PRINT | DELETE | MAKE PRIVATE | CREATE FLEXBOOK   CREATE CHAPTER |
| EDITING: PEOPLE'S PHYSICS BOOK | | | | | | ✕ CLOSE |
| 1 UNITS AND PROBLEM SOLVING | | | | | ▽ ACTION | TITLE |
| 2 ENERGY CONSERVATION | METADATA/ PARAMETERS | | | | ▽ ACTION | DESCRIPTION |
| 3 ONE DIMENSIONAL MOTION | NAME | | VALUE | | ▽ ACTION | ATTRIBUTES |
| 4 LIGHT | DIFFICULTY ∨ | | ADVANCED ∨ | | ▽ ACTION | TAGS |
| 5 NEWTON'S LAWS | | | | | ▽ ACTION | PHYSICS NEWTONS LAWS; LIGHT; |
| 6 CENTRIPETAL FORCES | | | | REMOVE | ▽ ACTION | |
| 7 MOMENTUM CONSERVATION | | | | | ▽ ACTION | |
| 8 ENERGY AND FORCE | | OK | CANCEL | | ▽ ACTION | |
| 9 ROTATIONAL MOTION | | | | | ▽ ACTION | |
| 10 SIMPLE HARMONIC MOTION | | | | | ▽ ACTION | |
| 11 WAVE MOTION AND SOUND | | | | | ▽ ACTION | |
| 12 ELECTRICITY | | | | | ▽ ACTION | |
| 13 ELECTRIC CIRCUITS: CAPACITORS | | | | | ▽ ACTION | |
| 14 MAGNETISM | | | | | ▽ ACTION | |
| 15 TWO DIMENSIONAL AND PROJECTILE MOTION | | | | | ▽ ACTION | |
| 16 THERMODYNAMICS AND HEAT | | | | | ▽ ACTION | |
| 17 RADIO ACTIVITY AND NUCLEAR PHYSICS | | | | | ▽ ACTION | |

FIG. 12

| HOME | BROWSE | MY LIBRARY | PRINT CENTER | ADMIN | SUPER USER WELCOME, ADMIN | PROFILE | LOGOUT | HELP |
|---|---|---|---|---|---|---|---|---|
| | | | | | 🔍 PHYSICS | GO | ADVANCED | |
| ▲ | FLEXBOOK EDITOR | SAVE | PRINT | DELETE | MAKE PRIVATE | CREATE FLEXBOOK | | CREATE CHAPTER |

| EDITING: PEOPLE'S PHYSICS BOOK | | × CLOSE |
|---|---|---|
| 1 UNITS AND PROBLEM SOLVING | ▽ACTION | TITLE |
| 2 ENERGY CONSERVATION | ▽ACTION | DESCRIPTION |
| EDIT TAGS | | |
| 3 ONE DIMENSIONAL MOTION | NOTE: TAGS ARE SEMICOLON SEPARATED (EXAMPLE, SCIENCE, ELECTRON, PROTON) MAX 60 CHARS PER TAG | ▽ACTION | ATTRIBUTES |
| 4 LIGHT | | ▽ACTION | TAGS |
| 5 NEWTON'S LAWS | PHYSICS, NEWTON'S LAWS, MOTION, LIGHT | ▽ACTION | PHYSICS NEWTONS LAWS; LIGHT; MOTION |
| 6 CENTRIPETAL FORCES | | ▽ACTION | |
| 7 MOMENTUM CONSERVATION | | ▽ACTION | |
| 8 ENERGY AND FORCE | OK    CANCEL | ▽ACTION | |
| 9 ROTATIONAL MOTION | | ▽ACTION | |
| 10 SIMPLE HARMONIC MOTION | | ▽ACTION | |
| 11 WAVE MOTION AND SOUND | | ▽ACTION | |
| 12 ELECTRICITY | | ▽ACTION | |
| 13 ELECTRIC CIRCUITS: CAPACITORS | | ▽ACTION | |
| 14 MAGNETISM | | ▽ACTION | |
| 15 TWO DIMENSIONAL AND PROJECTILE MOTION | | ▽ACTION | |
| 16 THERMODYNAMICS AND HEAT | | ▽ACTION | |
| 17 RADIO ACTIVITY AND NUCLEAR PHYSICS | | ▽ACTION | |

FIG. 13

ASSOCIATION AND EXTRACTION OF CONTENT ARTIFACTS FROM A GRAPHICAL REPRESENTATION OF ELECTRONIC CONTENT

CROSS REFERENCE TO RELATED APPLICATIONS

This application claims the benefit of provisional patent application No. 61/121,188 titled "Association And Extraction Of Content Artifacts From A Graphical Representation Of Online Content", filed on Dec. 10, 2008 in the United States Patent and Trademark Office.

The specification of the above referenced patent application is incorporated herein by reference in its entirety.

BACKGROUND

In an online collaborative authoring and customized publishing environment, participating authors, moderators, publishers, and readers need to manage online books, articles, study chapters, research papers, other content artifacts online, etc. Community members may also need to catalog, organize, search, browse, or navigate through the content artifacts online. The community members may need to be provided with current and relevant information related to the content artifacts. Typically, a catalog of contents may be organized using one or a combination of online cataloging techniques based on taxonomy based hierarchical categories, preferred order of sequence, or conditional parameters. There is a need for leveraging the user's context and combining these online cataloging techniques in order to achieve better results and to provide reliable and accurate content management solutions to community members.

Community members may also need to be notified regarding relevant interdependencies related to the content artifacts as well as information based on multi-dimensional characteristics, for example, geography, demography, curriculum, etc. There is a need to provide mechanisms to associate metadata tags corresponding to the content artifacts, both explicitly and implicitly to aid the community members in perusing the content artifacts. Furthermore, there is a need for graphically representing the online information obtained through search or publications to visually convey logical associations related to the searched or published content artifacts. Community members may also need to narrow down and extract contextual information from available online information obtained through the search.

Hence, there is a need for a computer implemented method and system that graphically represents electronic content on a multi-dimensional virtual lattice and enables association and extraction of content artifacts from the graphical representation of electronic content in order to provide the right content to the right user at the right time with minimal user interaction.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated needs for associating and extracting content artifacts from a graphical representation of electronic content. As used herein, "electronic content" refers to, for example, online content, web pages, files, word processing electronic documents, etc.

The computer implemented method disclosed herein comprises: a) creating a multi-dimensional virtual lattice comprising one or more grid layers generated based on predefined content criteria, wherein nodes of the created multi-dimensional virtual lattice represent metadata acquired from the predefined content criteria; b) graphically representing the electronic content comprising content artifacts acquired from multiple content sources within the created multi-dimensional virtual lattice using the grid layers, wherein each of the content artifacts from the electronic content attaches to one or more of the nodes of the created multi-dimensional virtual lattice; c) receiving search criteria comprising keywords from a user; and d) extracting content artifacts attached to nodes of the created multi-dimensional virtual lattice whose metadata matches with the keywords in the search criteria.

The predefined content criteria comprise, for example, user defined content criteria and content criteria obtained from a metadata database. The predefined content criteria comprise, for example, domain criteria, standards criteria, pedagogic criteria, parametric criteria, demographic criteria, chronology criteria, format criteria, etc. The computer implemented method disclosed herein allows unique identification of the content artifacts attached to the nodes of the created multi-dimensional virtual lattice using multiple identifiers assigned by an artifact database. Each of the content artifacts from the acquired electronic content attaches to one or more of the nodes of the created multi-dimensional virtual lattice based on explicit definition provided by a user or implicit matching criteria generated by the computer implemented system disclosed herein.

In an embodiment, the grid layers comprise, for example, a foundation grid layer for representing the content artifacts based on domains, a standards grid layer overlaid on the foundation grid layer for logically representing the content artifacts based on a curriculum and state standards framework, a pedagogical grid layer overlaid on the standards grid layer and/or the foundation grid layer for pedagogically representing the content artifacts, and a parametric grid layer overlaid on the pedagogical grid layer for parametrically representing the content artifacts based on user defined attributes and a set of ad hoc representation parameters.

In the computer implemented method disclosed herein, implicit metadata and explicit metadata are acquired from the search criteria, the electronic content, and the predefined content criteria for associating the content artifacts that are graphically represented within the created multi-dimensional virtual lattice. The acquired metadata is stored in the metadata database. The associations between the content artifacts are also represented within the created multi-dimensional virtual lattice using the acquired metadata. The acquired metadata is validated against a predefined set of metadata stored in the metadata database. A graphical user interface is provided for acquiring the search criteria, the metadata, and the predefined content criteria.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIG. 10 exemplarily illustrates association of content artifacts using the foundation grid layer.

FIG. 11 exemplarily illustrates association of content artifacts using the standards grid layer.

FIG. 12 exemplarily illustrates association of content artifacts using the pedagogical grid layer.

FIG. 13 exemplarily illustrates association of content artifacts using the parametric grid layer.

DETAILED DESCRIPTION OF THE INVENTION

Figure 1:
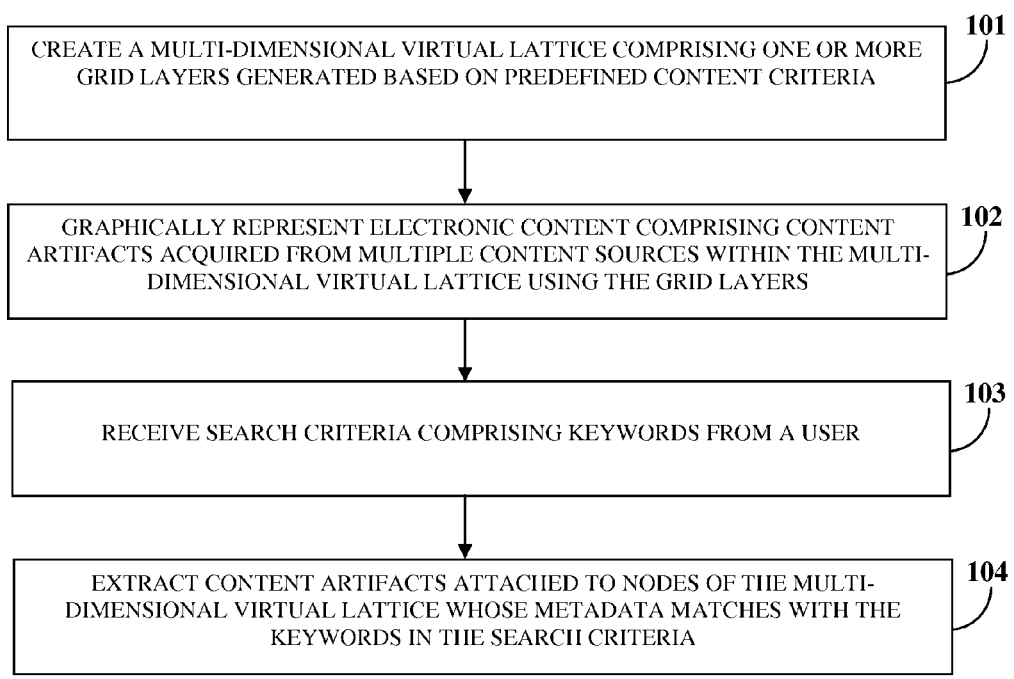
FIG. 1 illustrates a computer implemented method of associating and extracting multiple content artifacts from a graphical representation of electronic content.

FIG. 1 illustrates a computer implemented method of associating and extracting multiple content artifacts from a graphical representation of electronic content. As used herein, electronic content refers, for example, to online content, text files, audio files, video files, multimedia files, word processing electronic documents, etc. Online content comprises information retrieved online, for example, study material, textbooks, study notes, articles, images, study chapters, research papers, etc.

A multi-dimensional virtual lattice comprising one or more grid layers is created 101. The multi-dimensional virtual lattice comprises a multi-layered virtual coordinate system. The multi-layered virtual coordinate system is used for the graphical representation of acquired electronic content. The grid layers are generated based on predefined content criteria. The predefined content criteria comprise user defined content criteria, content criteria obtained from a metadata database, etc. The predefined content criteria comprise, for example, domain criteria, standards criteria, pedagogic criteria, parametric criteria, demographic criteria, chronology criteria, format criteria, etc.

Implicit metadata and explicit metadata are acquired from the predefined content criteria and stored in a metadata database. As used herein, "implicit metadata" refers to metadata automatically derived or generated by the computer implemented system disclosed herein. Also, as used herein, "explicit metadata" refers to metadata declared by a user. The implicit metadata comprises, for example, predefined tags, usage patterns, parsed keywords, rule-based pre-requisites, etc. The explicit metadata comprises, for example, user defined tags and parameters, content dependencies declared by domain experts, associations related to curriculum frameworks, etc. The implicit metadata and the explicit metadata may also be acquired and evolved from the search criteria provided by the user and the electronic content retrieved from multiple content sources. The acquired metadata is validated using a predefined set of metadata stored in the metadata database to ensure that the acquired metadata is a part of the predefined set of metadata. If the acquired metadata is not a part of the predefined set of metadata, the metadata database is updated by adding the acquired metadata to the set of predefined metadata. For example, the metadata "CA", a state standard, is validated using a predefined set of "state standards" metadata.

The nodes of the created multi-dimensional virtual lattice represent the acquired metadata. Electronic content is acquired from multiple content sources. The content sources are, for example, web sites, information repositories, online libraries, content servers, etc. The electronic content is acquired from the content sources based on search criteria provided by a user or by predefined criteria. For example, content licensed under Creative Commons share alike (CC-by-SA) license may be acquired from a specific web site. The search criteria comprise keywords and search terms provided by the user, for example, "algebra", "algebra: quadratic equations", "algebra: quadratic equations by author name", etc. The electronic content is acquired using a combination of search strategies. The search strategies are, for example, a hierarchical search, a flat search, and a parametric search. In the hierarchical search, the electronic content is categorized based on predefined taxonomies. For example, the search term "algebra" may return results categorized into "algebra books", "algebra quizzes", "algebra tutorials", "quadratic equations", "cubic polynomials", etc. In the flat search, the retrieved electronic content is explicitly and implicitly associated with the search terms. For example, the search term "algebra" may provide a list of highest ranked electronic content sources with the word "algebra" occurring frequently. In the parametric search, the user may provide, in addition to the search term, a set of parameters to limit the search results. For example, the user may provide names of specific authors as parameters with the search term "algebra" to narrow down the search results.

The electronic content comprises one or more content artifacts. As used herein, the term "content artifacts", refers to standalone units of the electronic content. A content artifact is, for example, a book, a chapter from a book, an outline of a chapter, an image, a lesson plan, a lesson, a unit, a worksheet, or an entire syllabus. Each of the content artifacts may further comprise other content artifacts. For example, a content artifact "book" may comprise multiple content artifacts, for example, "chapters". Each of the chapters may comprise multiple content artifacts, for example, "images", etc. In this example, "book" is referred to as a parent content artifact of a child content artifact "chapter" and "chapter" is referred to as a parent content artifact of child content artifacts "images". The content artifacts may be holistic content artifacts, image or media objects, a logical grouping of content, a collection of chapters, etc.

The content artifacts further comprise metadata. A child content artifact inherits the metadata of a parent content artifact. If a first content artifact is used within a second content artifact that is not a parent content artifact of the first content artifact, the first content artifact retains the metadata of the parent content artifacts of the first content artifact. By corollary, if a first content artifact uses a second content artifact but is not a parent content artifact of the second content artifact, the second content artifact will not inherit the metadata of the first content artifact.

The acquired electronic content comprising the content artifacts is graphically represented 102 within the created multi-dimensional virtual lattice using the grid layers. Each of the content artifacts from the acquired electronic content attaches to one or more of the nodes of the created multi-dimensional virtual lattice. In an embodiment, a user may explicitly define the attachment of specific content artifacts to specific nodes of the created multi-dimensional virtual lattice. In this embodiment, the content artifacts from the electronic content attaches to one or more of the nodes of the created multi-dimensional virtual lattice based on explicit definition provided by the user. In another embodiment, the computer implemented system disclosed herein may implicitly attach specific content artifacts based on matching criteria. Further, keywords from the content artifact are parsed and indexed. The nodes associated with the acquired metadata are reverse indexed to enable quick retrieval of the content artifacts.

The acquired electronic content may be represented in a predefined design pattern. Herein, the predefined design pattern is exemplarily referred to as a "model view controller pattern". The grid layers of the multi-dimensional virtual lattice are employed to apply combinatorial criteria conditions on the electronic content for association and extraction of the content artifacts. Search results based on the search criteria are modeled in the model view controller pattern in the graphical representation. The model is a combination of pre-defined and ad-hoc metadata mapped onto the multi-dimensional virtual lattice with horizontal grid layers mapped to specific sub-sets of the domain. The views are based on the specific slices of the multi-dimensional virtual lattice as specified by the user. The controls are exposed to the end-user via an asynchronous JavaScript+ extensible markup language (AJAX) based or Flash based graphical user interface (GUI) to associate and extract content artifacts to and from the multi-dimensional virtual lattice.

The content artifacts attached to the nodes of the created multi-dimensional virtual lattice are uniquely identified using multiple identifiers assigned by an artifact database. The identifiers are, for example, a unique identifier (UID), an encoded identifier (EID), and a scoped identifier (SID). The UID is machine generated and intended for internal use. The UID is not human readable and may not be manipulated externally. The UID is assigned to each of the content artifacts by the artifact database.

The EID is explicitly assigned to each of the content artifacts based on conventions predefined by an administrator. The EID encodes details about the content artifact. The EID enables an understanding of the nature of the content artifact and is both human interpretable and machine readable. The EID for identifying the content artifact is regarded as analogous to an international standard book number (ISBN) used for identifying a book. EIDs are generated with encodings for predefined taxonomies. An EID is represented as, for example, "SL.SUB.NNNN.CC.DDDD".

The SID is explicitly assigned to each of the content artifacts based on predefined identification rules. The SID is namespace scoped for enabling quick access to the content artifact. SIDs is used for accessing the content artifacts with minimalist keys from one form of manifestation to another. For example, an SID for a video animation from a printed virtual book is used online to view the video animation. An SID for a content artifact is regarded as analogous to a phone number or a social security number of a person. An SID is represented as, for example, "XXX-XXX-XXXX".

The associations between the identified content artifacts are represented within the graphical representation of the acquired electronic content on the created multi-dimensional virtual lattice. For example, if a chapter is a part of a book, the association between the chapter and the book is indicated visually. The associations are represented between any two or more of the content artifacts, for example, between a book and a curriculum, an image and a chapter, etc. The associations between the identified content artifacts are determined and represented using the acquired metadata associated with the content artifacts. In an embodiment, the associations between the identified content artifacts may also be represented based on application programming interfaces (APIs). Different association strategies are employed for the association of the content artifacts. The association strategies comprise, for example, associating a given content artifact with a set of user specified content metadata, parsing and indexing a set of keywords from a given content artifact, parsing and indexing a collection of keywords from a given set of metadata, and associating a set of user defined metadata with a coordinate in the multi-dimensional virtual lattice.

The user provides search criteria using a graphical user interface (GUI) or through an application programming interface (API). The search criteria comprise keywords. The metadata is acquired from the search criteria and validated using a predefined set of metadata stored in the metadata database to ensure that the acquired metadata is a part of the predefined set of metadata. If the acquired metadata is not a part of the predefined set of metadata, the metadata database is updated by adding the acquired metadata to the set of predefined metadata. On receiving 103 the search criteria from the user, the keywords from the search criteria are compared with the acquired metadata to find a match. The content artifacts attached to the nodes or combination of nodes of the created multi-dimensional virtual lattice whose metadata matches with the keywords in the search criteria are extracted 104 and are rendered to the user. The extracted content artifacts may be stored on the user's computing device. The grid layers enable selective extraction of the content artifacts from the acquired electronic content.

Different access strategies are employed for the extraction of the content artifacts. The access strategies comprises, for example, identifying electronic content associated with a user specified set of metadata, identifying coordinates that are associated with a user specified set of metadata, identifying indices associated with a user specified keyword, identifying content artifacts associated with a specific index, filtering out specific types of content artifacts from a given set of content artifacts, etc.

Consider an example of a user who is a student interested in learning about "Optics". The student may search for "Advanced Topics on Optics" comprising subtopics on Dispersion, Total Internal Reflection, Spectrometry, Laser Physics, etc. The user may alternatively be a parent of a seventh grade student in California searching for "CA $7^{th}$ grade math"

to retrieve electronic content relevant to and associated with "California's 7$^{th}$ grade mathematics" curriculum. The user may also be a teacher who needs to provide additional information to students on a particular subject. The teacher may search for books with challenging homework along with interesting home based experiments for learning the particular subject. The graphical representation comprises mapping the retrieved electronic content onto the grid layers. The acquired metadata is used to determine virtual coordinates for the mapping. The user may then extract content artifacts attached to the determined virtual coordinates from the graphical representation. The user may extract content artifacts associated with specific indexed keywords which are in turn mapped to the virtual coordinates.

The user may also organize the extracted content artifacts based on end user requirements. For example, an editor may create a course pack on "Thermodynamics" by charting out a lesson plan and extracting course material covering "Heat", "Laws of Thermodynamics", "Heat & Mass Transfer", "Enthalpy", and "Entropy". A user may also upload or contribute content artifacts online. The uploaded or contributed content artifacts may be associated with a set of user specified content metadata. The user specified content metadata may be associated with a virtual coordinate on the multi-dimensional virtual lattice.

The extraction of content artifacts from the graphical representation of the electronic content is applicable for various fields, for example, online educational content repositories, demographic targeted online publications, and data elements associated with metadata tags. The computer implemented method disclosed herein also enables batch uploads of content artifacts, archival, retrieval, and downloads of the content artifacts from the online content. Dependents, dependencies, advanced topics, and detailed topics related to a content artifact based on the search criteria may also be identified. For example, given a chapter, the user is allowed to associate and graphically represent the chapter appropriately within the multi-dimensional virtual lattice. Given a topic, the user can find all the relevant chapters associated with that topic. Given a chapter or a topic, the computer implemented system disclosed herein correlates the related topics and chapters mapped within the multi-dimensional virtual lattice and presents the correlation to the user.

The different grid layers enable the user to associate curriculum standards, for example, grade levels, state standards, national standards, associations, charter school syllabi, etc., to a specific content artifact or a topic corresponding to the specific content artifact. The user may also tag keywords, for example, "know", "understand", "learn", "practice", "experiment", "develop", "quiz" to a collection of content artifacts based on pedagogical requirements. The user may rate, review, and recommend the content artifacts based on predefined content criteria. The predefined content criteria for the content artifacts are, for example, "Popular", "Helpful", "Endorsed", etc.

Figure 2:
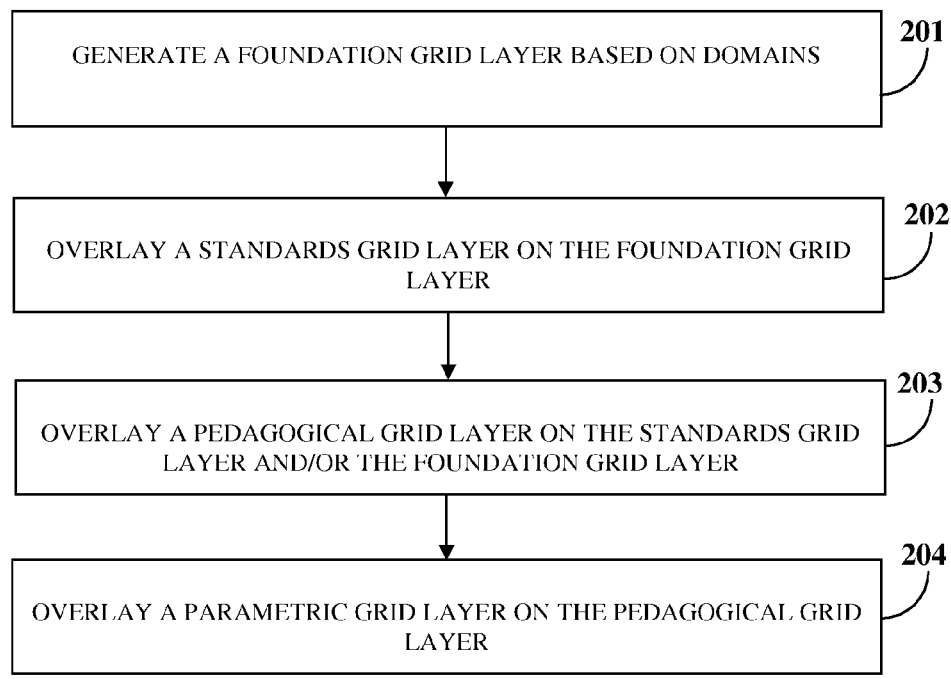
FIG. 2 exemplarily illustrates a computer implemented method of creating a multi-dimensional virtual lattice.

FIG. 2 exemplarily illustrates a computer implemented method of creating the multi-dimensional virtual lattice. In this example, the multi-dimensional virtual lattice is created using four grid layers, for example, a foundation grid layer, a standards grid layer, a pedagogical grid layer, and a parametric grid layer. Consider an example where a user wishes to create a multi-dimensional virtual lattice for associating and extracting multiple content artifacts, for example, algebra chapters. The predefined content criteria comprise, for example, the domain criteria, the standards criteria, the pedagogic criteria, and the parametric criteria. Metadata associated with the predefined content criteria is acquired. The foundation grid layer, the standards grid layer, the pedagogical grid layer, and the parametric grid layer are generated using the predefined content criteria. The nodes of the created multi-dimensional virtual lattice represent the metadata acquired from the predefined content criteria.

The foundation grid layer is generated 201 for representing the content artifacts based on domains. The content artifacts based on domains are not influenced by qualifying factors, for example, demographical considerations, geographical considerations, etc. The foundation grid layer comprises a predefined taxonomy of content domains, for example, domains, subjects, topics, sub-topics, benchmarks, etc, derived from the collection of electronic content. For example, if a content artifact relating to algebra is mapped onto the foundation grid layer, the mapping is performed without taking into consideration location of the user, complexity of the retrieved electronic content, or compliance of the retrieved content to standards.

In an embodiment, the domains are determined and/or scoped based on search criteria provided by the user. A domain in the field of mathematics, for example, "algebra" is fragmented into topics and subtopics related to algebra on the foundation grid layer. The domain "algebra" is fragmented into topics, for example, "quadratic equations" and "linear algebra" and subtopics related to the topics respectively, for example, "variables", "polynomials", "equations", "matrices", etc. In another example, a domain in the field of science, for example, "Physics" may be fragmented into topics and subtopics related to physics on the foundation grid layer. The domain "Physics" may be fragmented into topics, for example, "Matter" and "Optics" and subtopics related to the topics respectively, for example, "Particles & Matter", "Motion", "Newton's Laws", "Momentum, Acceleration, Force, Gravitational Force", and "Reflection, Refraction, Dispersion, Total Internal Reflection", etc. In another example, a domain in the field of science, for example, "Chemistry" may be fragmented into topics and subtopics related to chemistry on the foundation grid layer. The domain "Chemistry" may be fragmented into a topic, for example, "Organic Chemistry" and subtopics related to the topics respectively, for example, "Carbon Atomic Structure", "Polymers", "Polyester", etc.

The standards grid layer is overlaid 202 on the foundation grid layer for logically representing the content artifacts based on a curriculum and state standards framework. The logical representation of the content artifacts comprises, for example, representation based on curricula, location of the user, and education level of the user. For example, a content artifact may be represented as 9$^{th}$ grade California, 10$^{th}$ grade National Council of Education Research and Training (NCERT), etc. The representation is performed based on user preferences. The overlaying of the standards grid layer on the foundation grid layer filters the domain specific content on the foundation grid layer to obtain a narrower set of content relevant to user preferences. The standards grid layer comprises a predefined set of regulations associated with the domains, for example, standards associated with geographical domains, criteria, rules, guidelines, curriculum, etc. The standards grid layer is superimposed over the foundation grid layer to establish logical coordinates of a specific electronic content. For example, the domain "algebra" is fragmented into topics, for example, "matrices" and regulations related to the topics, for example, "9$^{th}$ grade CA", "9$^{th}$ grade NCERT", "10$^{th}$ grade IB". The regulations are based on educational curriculum, geographical locations, demography, educational institutions, organizations, etc.

The pedagogical grid layer is overlaid 203 on the standards grid layer and/or the foundation grid layer for pedagogically representing the content artifacts. The pedagogical representation comprises representation based on pedagogical attributes, for example, complexity of the content artifact. The pedagogical representation may also be based on outcomes preferred by the user. As an example, a user retrieves the electronic content based on learning criteria, for example, "text" based books, "video" based learning objects, "flash" based animation, etc. In another example, the user acquires the electronic content based on difficulty levels, for example, a "beginner level", an "expert level", and "advanced topics". Alternatively, the user retrieves electronic content based on both learning criteria and difficulty levels, for example, "text" based books at a beginner level, expert topics on "flash" based animation, etc. In another example, the user associates different keywords, for example, "know", "understand", "learn", "practice", "experiment", "develop", and "quiz" to cluster the electronic content based on the outcomes preferred by the user. The pedagogical layer comprises a predefined set of pedagogical requirements and content attributes. The pedagogical layer is superimposed over the foundation grid layer, the standards grid layer, or both in order to associate the content criteria of the retrieved electronic content. For example, problem sets "$X^3-8=0$", "$X^3-729=0$" is tagged with metadata "easy" and "hard" respectively on the pedagogical layer. The content criteria are based on pedagogical requirements and usage outcome requirements.

The parametric grid layer is overlaid 204 on the pedagogical grid layer for parametrically representing the content artifacts based on user defined attributes and a set of ad hoc representation parameters. The ad hoc representation parameters comprise, for example, an online rating of the retrieved electronic content, ownership of the electronic content, popularity of the retrieved electronic content, license types of the retrieved electronic content, etc. The ad hoc representation parameters are provided by the user based on the user's preferences. For example, the user may want to retrieve the most popular $6^{th}$ grade algebra content not requiring a digital rights management (DRM) license. The parametric grid layer comprises usage based metadata. The parametric grid layer takes into consideration relevance attributes of the electronic content. For example, a domain "algebra" is fragmented into a topic "matrices" along with relevance attributes related to the topic, for example, "matrices by Giancolli (Popular)", "matrices by Hewitt (Popular in CA)", etc.

A user, for example, performs a flat search and acquires electronic content, for example, "algebra chapters" from multiple content sources. The content artifacts of the electronic content get attached to one or more nodes of the created multi-dimensional virtual lattice based on the metadata represented by the nodes.

Consider an example where another user wishes to acquire a seventh grade algebra chapter. The user provides search criteria, for example, "algebra", "7th grade", etc. The metadata associated with the search criteria are acquired and the content artifacts attached to the nodes of the created multi-dimensional virtual lattice whose metadata matches with the acquired metadata of the search criteria are extracted and are rendered to the user.

Any number of grid layers may be overlaid on the multi-dimensional virtual lattice. Each of the grid layers may provide different representations to associate and extract the acquired electronic content. Each grid layer may be user customizable. Furthermore, each grid layer described above may be used in isolation or in any combination thereof. The overlaying process need not necessarily follow the order of overlaying described above.

Figure 3:
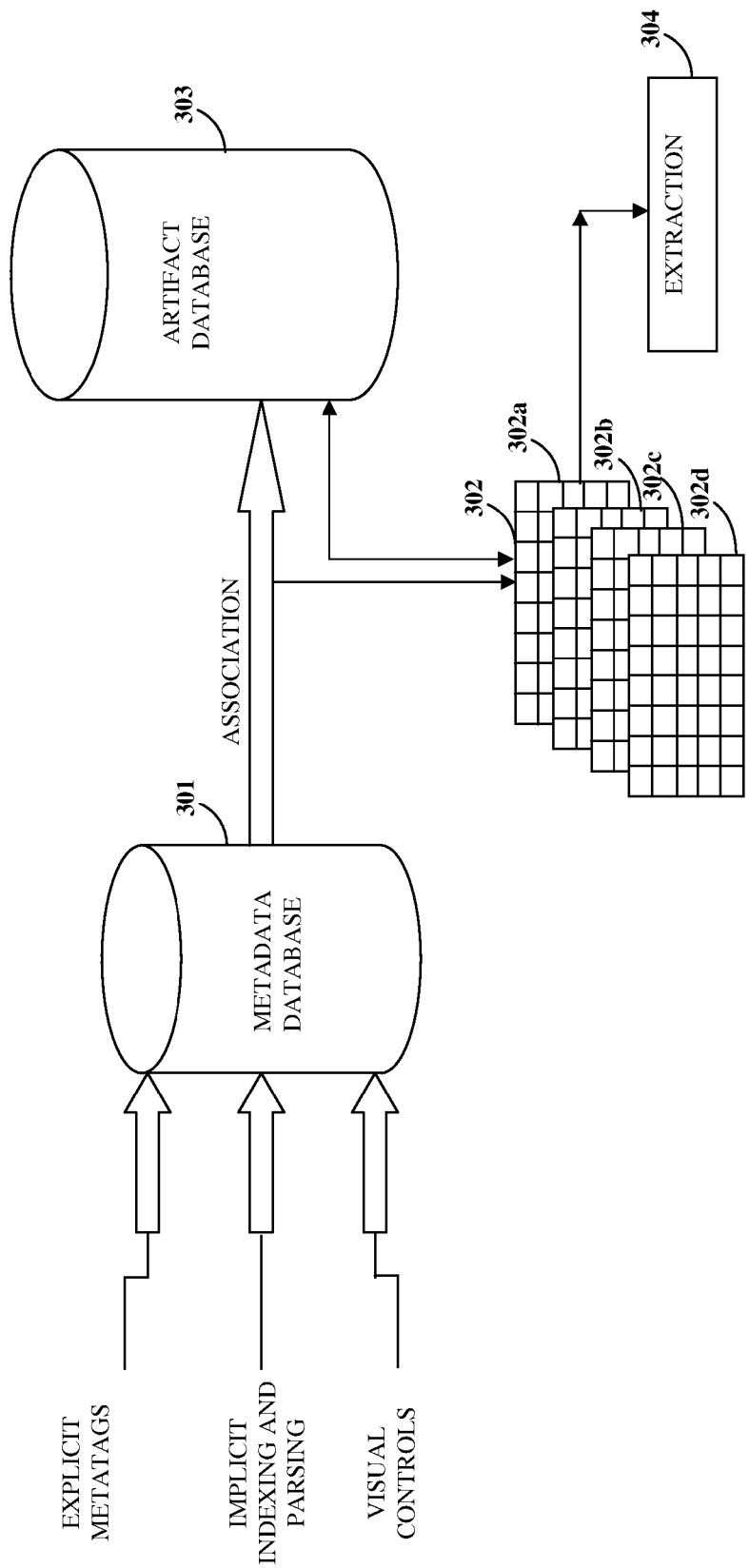
FIG. 3 exemplarily illustrates a computer implemented method of graphically representing electronic content comprising content artifacts within a multi-dimensional virtual lattice for associating and extracting the content artifacts from the multi-dimensional virtual lattice.

FIG. 3 exemplarily illustrates a computer implemented method of graphically representing electronic content comprising content artifacts within a multi-dimensional virtual lattice 302 for associating and extracting the content artifacts from the multi-dimensional virtual lattice 302. Consider an example where a first user wishes to create a multi-dimensional virtual lattice 302 comprising four grid layers 302a, 302b, 302c, and 302d. The first user provides user defined content criteria using the GUI. Metadata associated with the user defined content criteria is extracted. Various methods are employed for extracting the metadata, for example, explicit metatags, implicit indexing and parsing, visual controls, etc.

The extracted metadata is validated using a predefined set of metadata in the metadata database 301. If the extracted metadata is not a part of the predefined set of metadata, the metadata database 301 is updated by adding the extracted metadata to the predefined set of metadata. The multi-dimensional virtual lattice 302 comprising four grid layers 302a, 302b, 302c, and 302d, is created. The nodes of the multi-dimensional virtual lattice 302 represent one or more of the extracted metadata.

Electronic content comprising content artifacts is acquired from multiple content sources. An artifact database 303 is updated with the acquired content artifacts. The acquired electronic content is mapped on to the created multi-dimensional virtual lattice 302 using the four grid layers 302a, 302b, 302c, and 302d, and the content artifacts associated with the acquired electronic content get attached to one or more nodes of the created multi-dimensional virtual lattice 302. The contents artifacts are uniquely identified using multiple identifiers assigned by the artifact database 303. The associations between the identified content artifacts are also represented graphically within the created multi-dimensional virtual lattice 302 using the acquired metadata.

A second user provides search criteria. The metadata associated with the search criteria is acquired and the content artifacts attached to the nodes of the created multi-dimensional virtual lattice 302 whose metadata matches with the acquired metadata of the search criteria are extracted 304 and are rendered to the second user.

Figure 4:
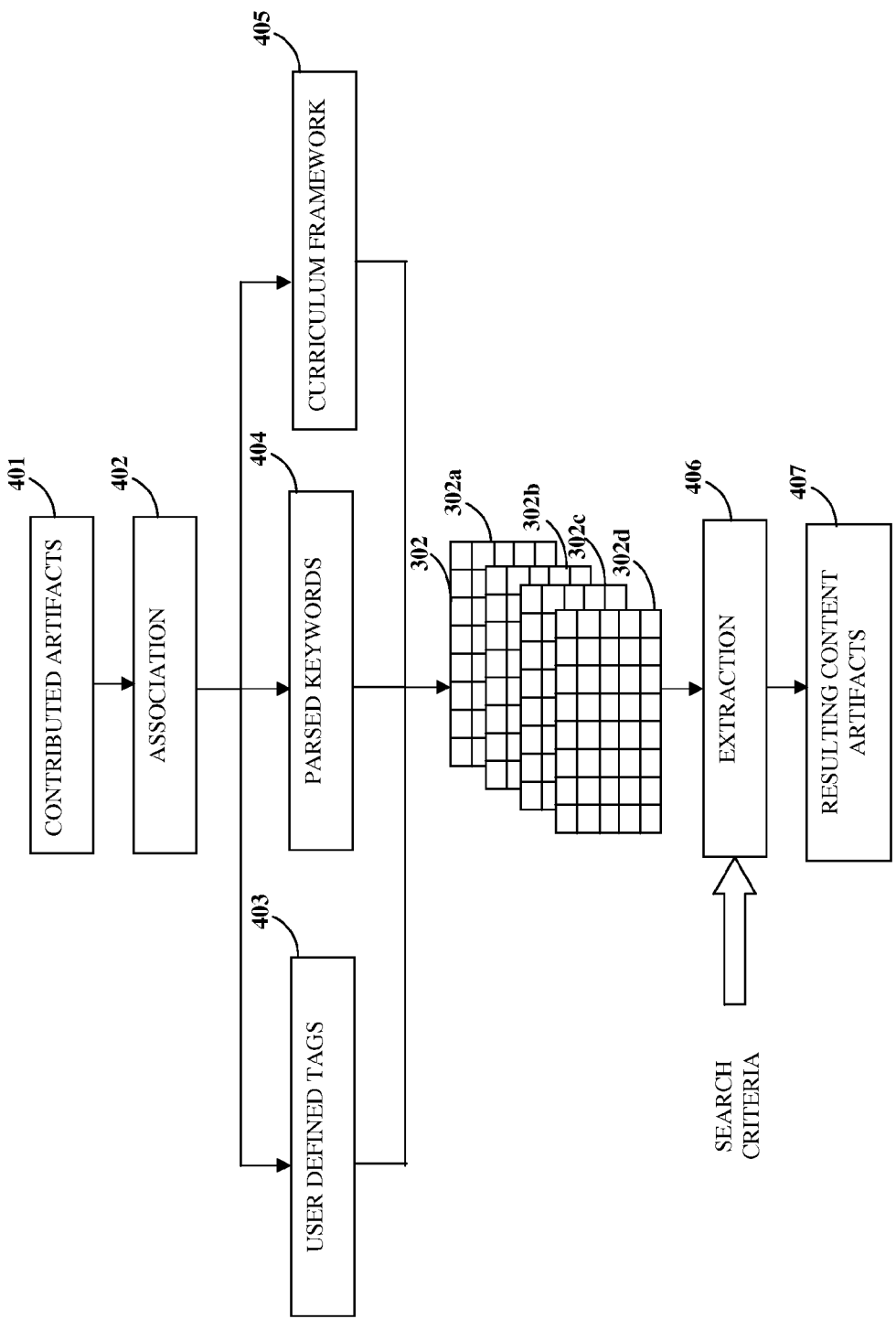
FIG. 4 exemplarily illustrates a computer implemented method of graphically representing the acquired electronic content on the multi-dimensional virtual lattice for extracting content artifacts.

FIG. 4 exemplarily illustrates a computer implemented method of graphically representing the acquired electronic content on the multi-dimensional virtual lattice 302 for extracting content artifacts. A first user may contribute content artifacts 401. The contributed content artifacts 401 are associated 402 with one or more nodes within the created multi-dimensional virtual lattice 302 based on their metadata. The metadata of the contributed content artifacts 401 comprising, for example, user defined tags 403, parsed keywords 404, curriculum framework 405, etc. is acquired. The contributed content artifacts 401 are mapped on the created multi-dimensional virtual lattice 302 comprising the grid layers 302a, 302b, 302c, and 302d based on the matching metadata coordinates. The contributed content artifacts 401 attach to one or more nodes of the created multi-dimensional virtual lattice 302 based on their metadata. On receiving search criteria comprising keywords from a second user, the content artifacts are extracted 406 from the created multi-dimensional virtual lattice 302 as disclosed in the detailed description of FIG. 1 and the resulting content artifacts 407 are rendered to the second user.

Figure 5:
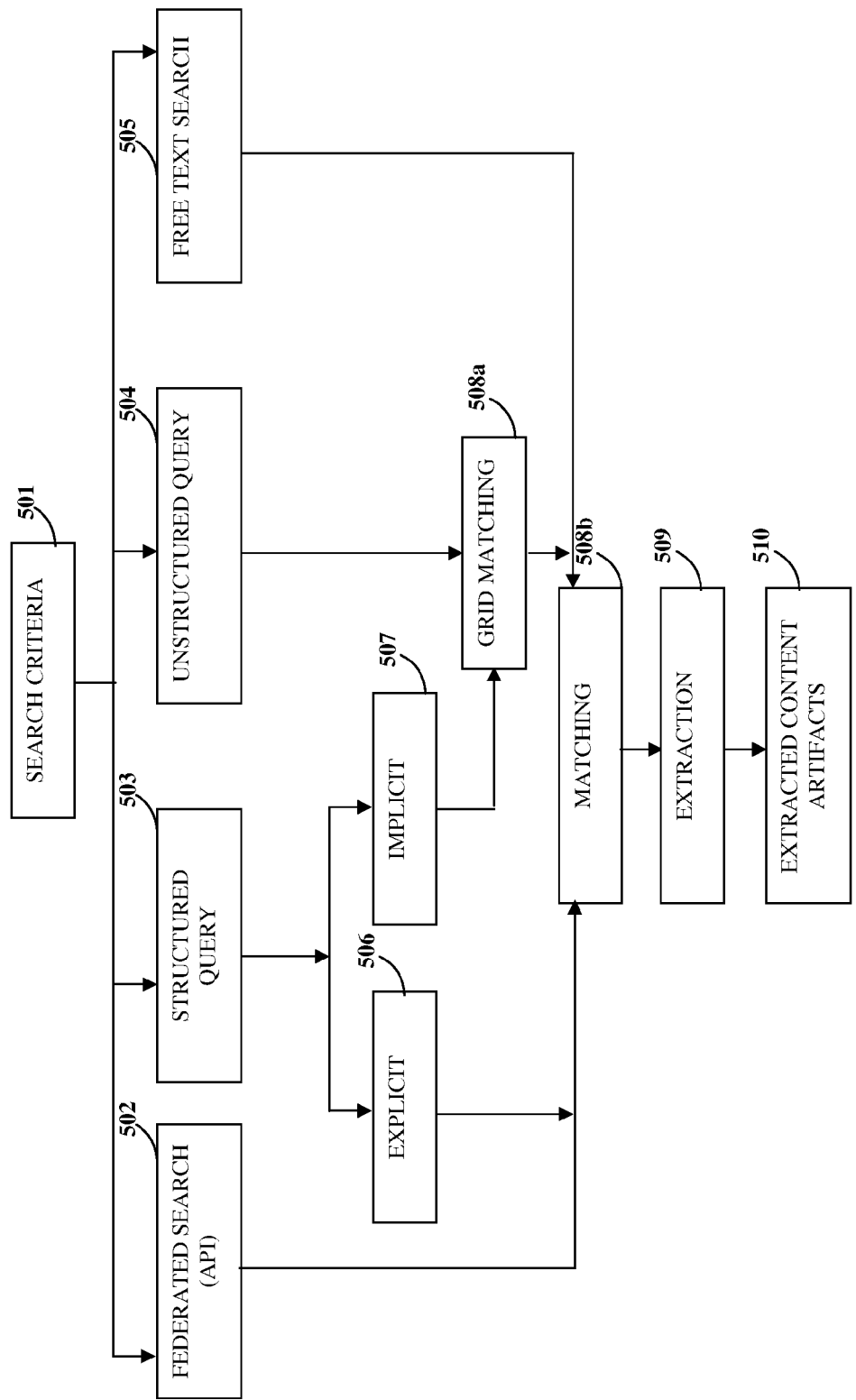
FIG. 5 exemplarily illustrates a computer implemented method of extracting content artifacts attached to nodes of a multi-dimensional virtual lattice whose metadata matches with keywords in search criteria provided by a user.

FIG. 5 exemplarily illustrates a computer implemented method of extracting content artifacts attached to the nodes of a multi-dimensional virtual lattice 302 whose metadata matches with the keywords in the search criteria 501 provided by a user. Consider an example where the user wishes to extract one or more content artifacts from a multi-dimensional virtual lattice 302. The user specifies search criteria 501 comprising keywords. The search criteria 501 may be used to conduct a federated search 502 that is executed via an application programming interface (API) of external systems, a structured query search 503 that is executed as an explicit database query or implicit extraction from the multi-dimensional virtual lattice 302, an unstructured query search 504 that is executed as an implicit extraction from the multi-dimensional virtual lattice 302 using grid matching 508a, or a free text search 505 that is executed based on parsed and indexed keywords, and in turn mapped using the grid layers on the multi-dimensional virtual lattice 302. The structured query search 503 may be processed as an explicit search 506 and/or an implicit search 507. The content artifacts attached to the nodes of the created multi-dimensional virtual lattice 302 whose metadata matches 508b with the specified search criteria 501 are extracted 509 and the extracted content artifacts 510 are rendered to the user.

Figure 6:
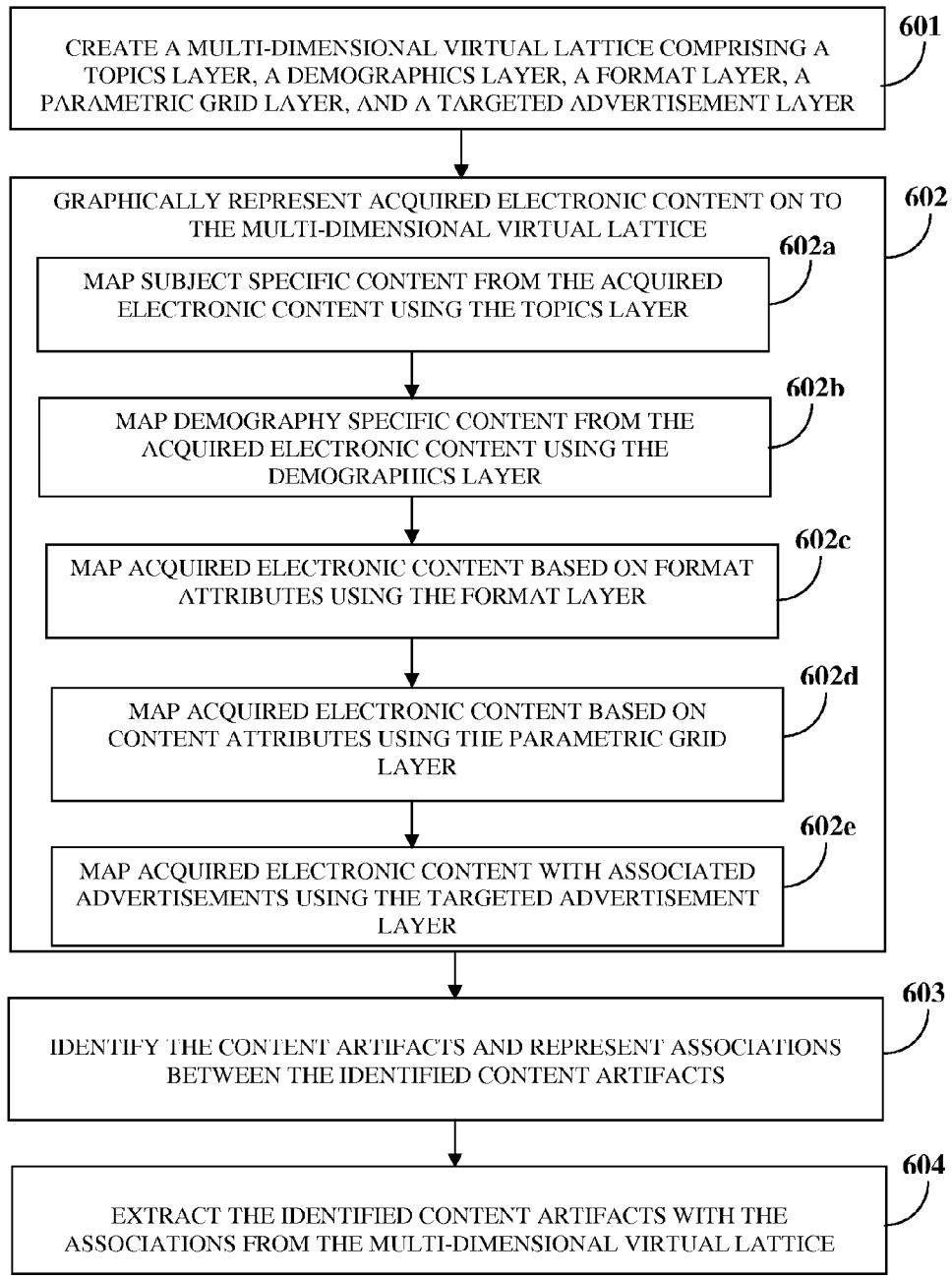
FIG. 6 exemplarily illustrates a computer implemented method of associating and extracting multiple content artifacts from a graphical representation of electronic content in a magazine publication platform.

FIG. 6 exemplarily illustrates a computer implemented method of associating and extracting multiple content artifacts from a graphical representation of electronic content in a magazine publication platform. Consider an example where a user wishes to create a custom magazine that caters to the personal interest of the user. The user provides the user defined content criteria, for example, subject criteria, demographic criteria, format criteria, parametric criteria, and target criteria, using the GUI. The metadata of the user defined content criteria is extracted.

The user creates 601a multi-dimensional virtual lattice 302 comprising a topics layer, a demographics layer, a format layer, a parametric grid layer, and a targeted advertisement layer. The topics layer, the demographics layer, the format layer, the parametric grid layer, and the targeted advertisement layer are generated based on the user defined content criteria. The nodes of the created multi-dimensional virtual lattice 302 represent the metadata extracted from the user defined content criteria.

The topics layer represents the content artifacts based on subjects, for example, business, science, entertainment, sports, etc. The demographics layer is overlaid on to the topics layer for logically representing the content artifacts based on demographic factors. The demographic factors comprise geographic constraints, for example, USA, Europe, Asia, etc. The geographic constraints may also pertain to states, for example, New York, California, Nevada, etc. The demographic factors may also comprise companies, for example, Google™, Dell™, IBM®, etc.

The format layer is overlaid on to the demographics layer for representing the content artifacts based on formats. The formats comprise, for example, news columns, news articles, blogs, etc. The parametric grid layer is overlaid on to the format layer for parametrically representing the content artifacts based on user defined attributes and the set of ad hoc representation parameters. The ad hoc representation parameters comprise, for example, free, paid, subscription basis, on demand, etc. A targeted advertisement layer is overlaid on the format layer for representing content artifacts with associated advertisements.

Electronic content is acquired from multiple content sources and is represented 602 graphically on the multi-dimensional virtual lattice 302 using the topics layer, the demographics layer, the format layer, the parametric grid layer, and the targeted advertisement layer. The electronic content is graphically represented on to the multi-dimensional virtual lattice 302 as follows: Subject specific content from the acquired electronic content is mapped 602a using the topics layer. Demography specific content from the acquired electronic content is mapped 602b using the demographics layer. The acquired electronic content based on format attributes is mapped 602c using the format layer. The electronic content acquired based on content attributes is then mapped 602d using the parametric grid layer. The acquired electronic content with associated advertisements is then mapped 602e using the targeted advertisement layer.

The content artifacts of the acquired electronic content attach to one or more nodes of the multi-dimensional virtual lattice 302. The content artifacts are uniquely identified 603 using multiple identifiers assigned by the artifact database 303 and associated within the created multi-dimensional virtual lattice 302. The associations between the content artifacts are also represented within the created multi-dimensional virtual lattice 302 using the acquired metadata. The user provides search criteria. The search criteria comprise keywords. The content artifacts associated with nodes of the created multi-dimensional virtual lattice 302 whose metadata matches with the keywords in the search criteria are extracted 604 from the multi-dimensional virtual lattice 302 and rendered to the user. The user can therefore generate a custom magazine with specified criteria, for example, "Articles and Blogs" that cover "Economic News from Europe and North America", and that are "for free as well as from subscribed sources". The free sources will embed targeted advertisements that are related to blogs and articles by the metadata keywords declared by the advertisers as part of the association process. The user can also create a weekly magazine tailored to specific interests by specifying for example, "Create October 19th Weekly: include Business News by Business Week; covering Apple Inc; as well as Asia Markets, include Technology News by TechCrunch; covering Apple Inc, Google; as well as iPhones, Android Phones".

Figure 7:
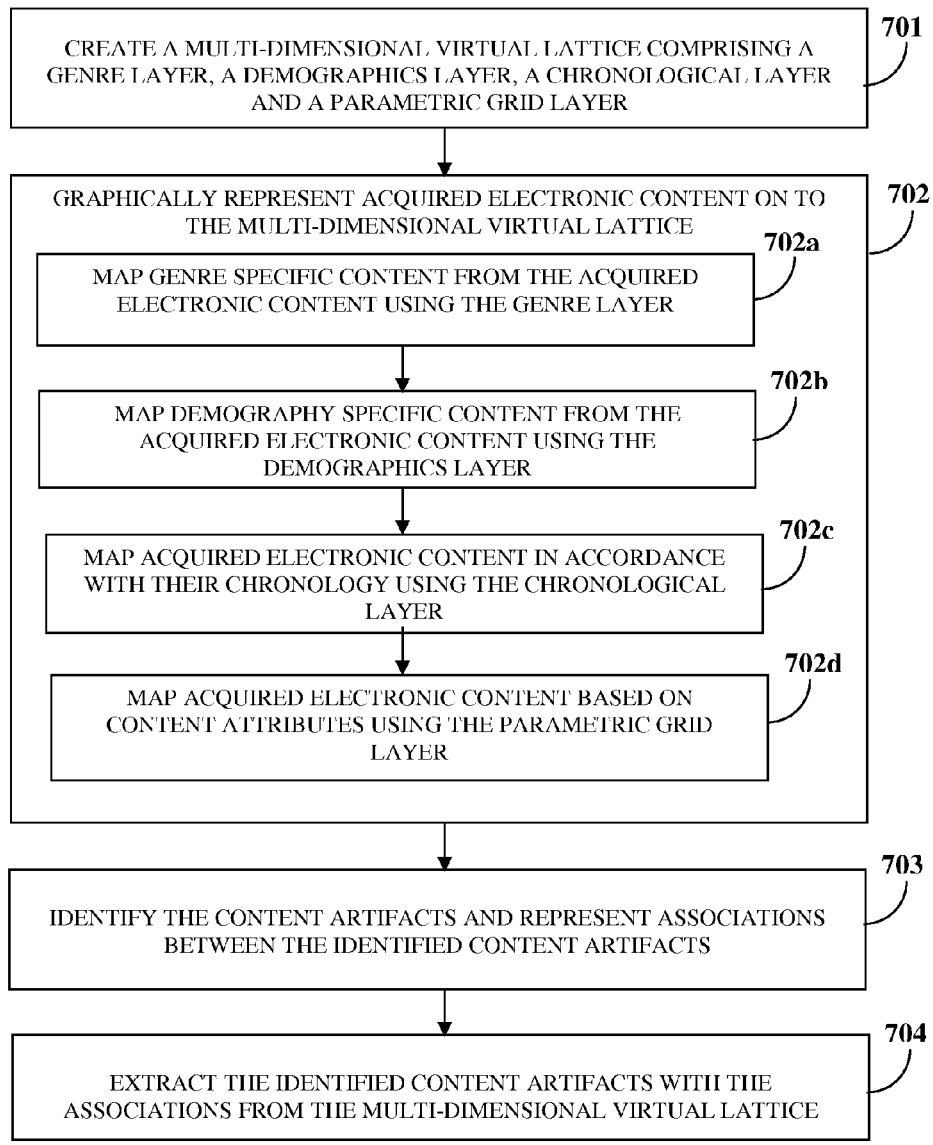
FIG. 7 exemplarily illustrates a computer implemented method of associating and extracting multiple content artifacts from a graphical representation of electronic content in a movie recommendation platform.

FIG. 7 exemplarily illustrates a computer implemented method of associating and extracting multiple content artifacts from a graphical representation of electronic content in a movie recommendation platform. The user provides the user defined content criteria, for example, genre criteria, demographic criteria, chronology criteria, and parametric criteria, using the GUI. The metadata of the user defined content criteria is extracted.

The user creates 701a multi-dimensional virtual lattice 302 comprising a genre layer, a demographics layer, a chronological layer, and a parametric grid layer. The nodes of the created multi-dimensional virtual lattice 302 represent the extracted metadata from the user defined content criteria. The genre layer represents acquired movies based on categorized genres, for example, romance, comedy, drama, action, thriller, documentary, etc.

The demographics layer is overlaid on the genre layer for representing acquired movies based on geographical constraints, for example, languages and geographical regions. The languages are, for example, English, Spanish, French, etc. The geographical region constraints are, for example, Hollywood, etc.

The chronological layer is overlaid on the demographics layer for representing acquired movies based on various time intervals, for example, classics, oldies, 80's, 90's, new releases, etc. The parametric grid layer is overlaid on the chronological layer for representing acquired movies based on user evaluation attributes, for example, high rated movies, low rated movies, movies recommended through friend's network, movies rated by Motion Pictures Association of America® (MPAA), etc.

Movies are acquired from multiple content sources and are represented 702 graphically on the multi-dimensional virtual lattice 302 using the genre layer, the demographics layer, the chronological layer, and the parametric grid layer. The electronic content is graphically represented on to the multi-dimensional virtual lattice 302 as follows: Genre specific content from the acquired electronic content is mapped 702a using the genre layer. Demography specific content from the acquired electronic content is mapped 702b using the demographics layer. The acquired electronic content is then mapped 702c in accordance with their chronology using the chronological layer. The acquired electronic content is then mapped 702d based on content attributes using the parametric grid layer.

The content artifacts of the movies, for example, movie soundtracks, movie synopses, etc. attach to one or more nodes of the multi-dimensional virtual lattice 302. The content artifacts are uniquely identified 703 using multiple identifiers assigned by the artifact database 303 and associated within the created multi-dimensional virtual lattice 302. The associations between the content artifacts are also represented within the created multi-dimensional virtual lattice 302 using the acquired metadata.

A user searching for movies provides search criteria comprising keywords. The content artifacts associated with nodes of the created multi-dimensional virtual lattice 302 whose metadata matches with the keywords in the search criteria are extracted 704 and rendered to the user. The user can get movie recommendations for specified criteria, for example, "newly released independent comedy movies rated for general audiences (G)".

Figure 8:
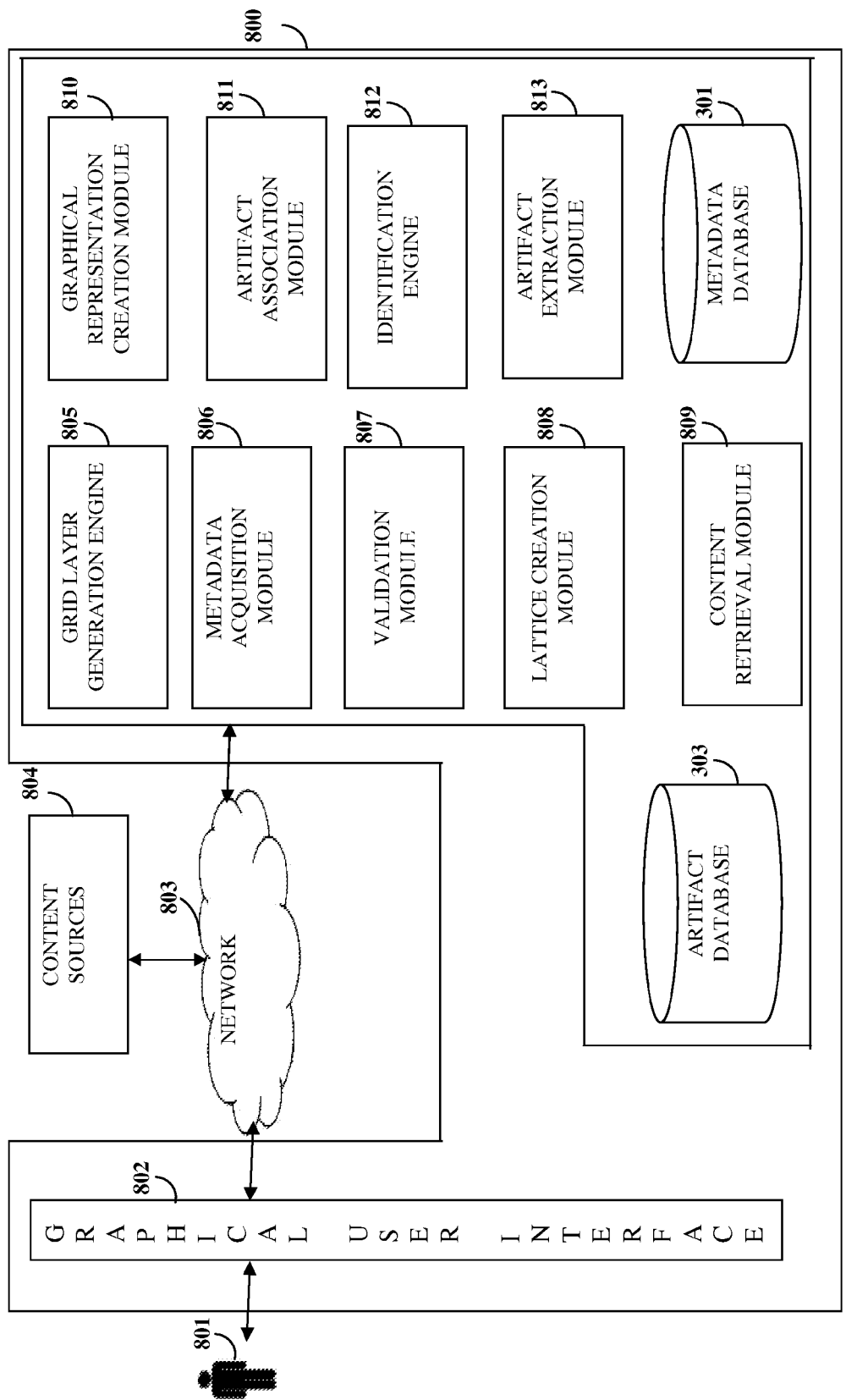
FIG. 8 illustrates a computer implemented system for associating and extracting multiple content artifacts from a graphical representation of electronic content.

FIG. 8 illustrates a computer implemented system 800 for associating and extracting multiple content artifacts from a graphical representation of electronic content. The computer implemented system 800 disclosed herein comprises a graphical user interface (GUI) 802, a grid layer generation engine 805, a metadata acquisition module 806, a validation module 807, a lattice creation module 808, a metadata database 301, a content retrieval module 809, a graphical representation creation module 810, an artifact association module 811, an identification engine 812, an artifact extraction module 813, and an artifact database 303.

A user 801 provides user defined content criteria via the GUI 802. The GUI 802 enables the user 801 to interactively control the association and the extraction of content artifacts. The search criteria, the metadata, and the predefined content criteria are acquired via the GUI 802. The GUI 802 provides the user 801 with interactive interface controls. For example, the interactive interface controls comprises drag and drop controls for correlating search results placed on the multi-dimensional virtual lattice 302 based on the search criteria. The search criteria are specified using a search panel provided on the GUI 802. Sliding visual controls may also be provided on the GUI 802 to scale, manipulate, and scroll horizontal and vertical dimensions of the graphical representation of electronic content. Radio buttons and check boxes may also be provided on the GUI 802 to select each of the horizontal grids or select multiple views of the graphical representation.

The grid layer generation engine 805 generates one or more grid layers based on the predefined content criteria. In an embodiment, the grid layer generation engine 805 performs the steps of: generating a foundation grid layer for representing the content artifacts based on domains; overlaying a standards grid layer on the foundation grid layer for logically representing the content artifacts based a curriculum and state standards framework; overlaying a pedagogical grid layer on the standards grid layer and/or the foundation grid layer for pedagogically representing the content artifacts; and overlaying a parametric grid layer on the pedagogical grid layer for parametrically representing the content artifacts based on user defined attributes and a set of ad hoc representation parameters. The grid layer generation engine 805 also generates, for example, a topics layer, a demographics layer, a format layer, a parametric grid layer, and a targeted advertisement layer in a magazine publication platform as disclosed in the detailed description of FIG. 6. The grid layer generation engine 805 also generates, for example, a genre layer, a demographics layer, a chronological layer, and a parametric grid layer in a movie recommendation platform as disclosed in the detailed description of FIG. 7.

The predefined content criteria comprise metadata. The metadata acquisition module 806 acquires implicit metadata and explicit metadata from the predefined content criteria, the search criteria, and the electronic content. The validation module 807 validates the acquired metadata using a predefined set of metadata stored in the metadata database 301. If the acquired metadata is not present in the metadata database 301, the validation module 807 updates the metadata database 301 with the acquired metadata.

The lattice creation module 808 creates a multi-dimensional virtual lattice 302 comprising the generated grid layers. The nodes of the created multi-dimensional virtual lattice 302 represent the metadata acquired from the predefined content criteria. The multi-dimensional virtual lattice 302 is created, maintained, and accessed within the random access memory such that the nodes can be built and rebuilt periodically.

The content retrieval module 809 acquires the electronic content from multiple content sources 804 via a network 803. The network 803 is, for example, a WiFi communication network, a general packet radio service (GPRS) network, a mobile telecommunication network, a local area communication network, an internet connection network, a Bluetooth™ communication network, an infra red communication network, etc. The acquired electronic content comprises the content artifacts. The content retrieval module 809 may utilize a combination of hierarchical, flat, and parametric search strategies for retrieving the electronic content from internally specified content sources 804 by performing a local search or from externally referred content sources 804 by performing a federated search. The retrieved electronic content comprises metadata.

The graphical representation creation module 810 graphically represents the acquired electronic content within the created multi-dimensional virtual lattice 302 using the generated grid layers. The artifact association module 811 attaches each of the content artifacts from the acquired electronic content to one or more nodes of the created multi-dimensional virtual lattice 302. The artifact association module 811 attaches each of the content artifacts from the acquired electronic content to one or more nodes of the created multi-dimensional virtual lattice 302 based on explicit definition provided by the user 801 or by matching metadata acquired by the metadata acquisition module 806 from the metadata database 301.

The identification engine 812 uniquely identifies the content artifacts attached to the nodes of the created multi-dimensional virtual lattice 302 using multiple identifiers assigned by the artifact database 303. The artifact association module 811 represents associations between the identified content artifacts within the graphical representation of the electronic content using the acquired metadata. The associations between the identified content artifacts may also be represented based on application programming interfaces (APIs). The artifact extraction module 813 extracts the identified content artifacts attached to the nodes of the created multi-dimensional virtual lattice 302 with the associations from the graphical representation of the electronic content based on the criteria specified by the user 801.

Figure 9:
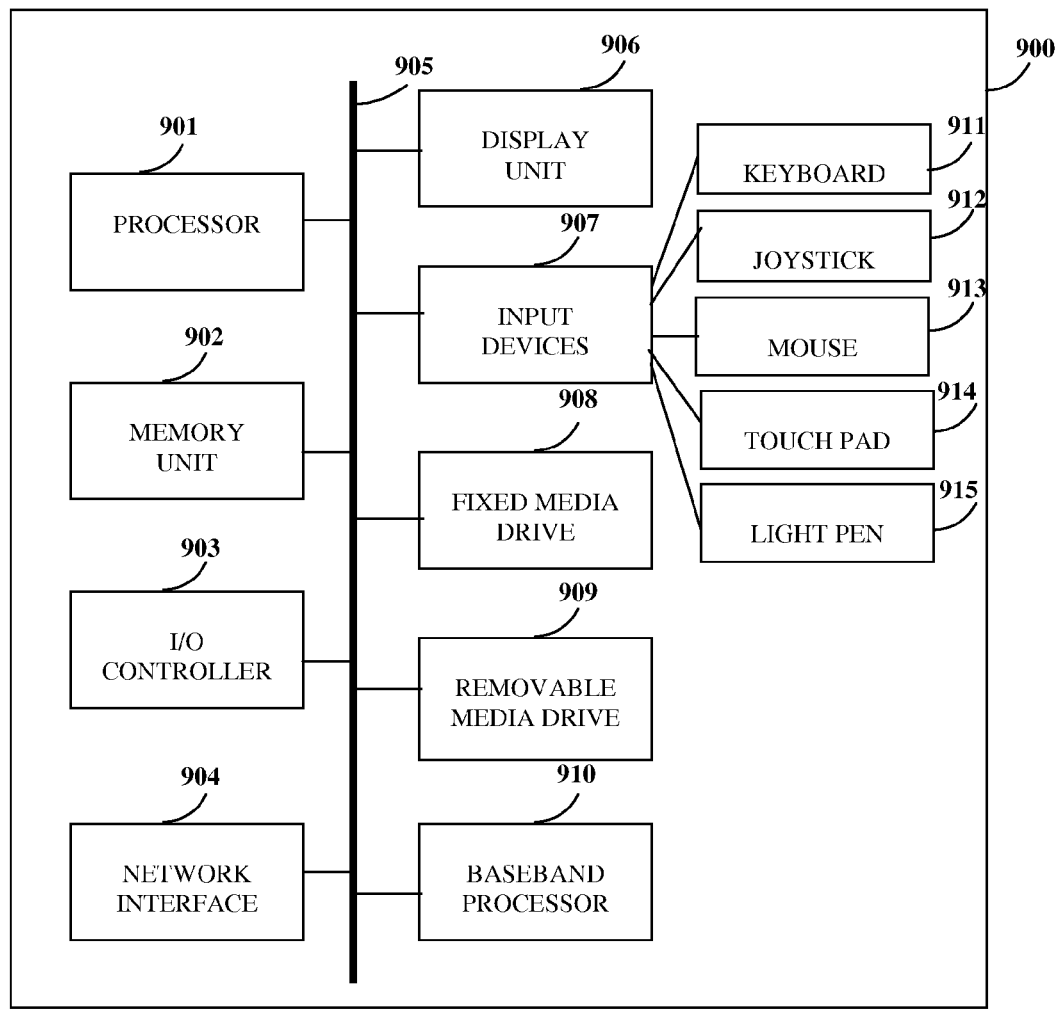
FIG. 9 exemplarily illustrates the architecture of a computer system employed for associating and extracting multiple content artifacts from a graphical representation of electronic content.

FIG. 9 exemplarily illustrates the architecture of a computer system 900 employed for associating and extracting content artifacts from a graphical representation of electronic content. A user 801 provides user defined content criteria using the GUI 802. The computer system 900 comprises, for example, a processor 901, a memory unit 902 for storing programs and data, an input/output (I/O) controller 903, a network interface 904, a network bus 905, a display unit 906, input devices 907, a fixed media drive 908, a removable media drive 909, a baseband processor 910, etc.

The processor 901 is an electronic circuit that can execute computer programs. The memory unit 902 is used for storing programs and applications. The memory unit 902 is, for example, a random access memory (RAM) or another type of dynamic storage device that stores information and instructions for execution by the processor 901. The memory unit 902 also stores temporary variables and other intermediate information used during execution of the instructions by the processor 901. The computer system 900 further comprises a read only memory (ROM) or another type of static storage device that stores static information and instructions for the processor 901. The network interface 904 enables connection of the computer system 900 to a network 803. The network 803 is, for example, a local area network (LAN), a wide area network (WAN), a cellular network, a satellite network, etc. In case of a mobile computing device, the network interface 904 connects the computing device wirelessly to the network 803. The mobile computing device further comprises a baseband processor 910 for processing communication functions and managing communication transactions with the network 803. The I/O controller 903 controls the input and output actions performed by the user 801. The network bus 905 permits communication between the modules, for example, 805, 806, 807, 808, 809, 810, 811, 812, and 813 of the computer implemented system 800 disclosed herein.

The display unit 906 displays computed results to the user 801. The input devices 907 are used for inputting data into the computer system 900. The input devices 907 are, for example, a keyboard 911 such as an alphanumeric keyboard, a joystick 912, a mouse 913, a touch pad 914, a light pen 915, etc. The computer system 900 further comprises a fixed media drive 908 and a removable media drive 909 for receiving removable media.

Computer applications and programs are used for operating the computer system 900. The programs are loaded onto the fixed media drive 908 and into the memory unit 902 of the computer system 900 via the removable media drive 909. In an embodiment, the computer applications and programs may be loaded directly through the network 803. Computer applications and programs are executed by double clicking a related icon displayed on the display unit 906 using one of the input devices 907. The user 801 interacts with the computer system 900 using the graphical user interface (GUI) 802 provided on the display unit 906.

The computer system 900 of the user 801 employs operating systems for performing multiple tasks. An operating system is responsible for the management and coordination of activities and the sharing of the resources of the computer system 900. The operating system further manages security of the computer system 900, peripheral devices connected to the computer system 900, and network connections. The operating system employed on the computer system 900 recognizes, for example, inputs provided by the user 801 using one of the input devices 907, manages the output display, files and directories stored locally on the fixed media drive 908, etc. The operating system on the computer system 900 of the user 801 executes different programs initiated by the user 801 using the processor 901. Instructions for executing the computer implemented method and system 800 disclosed herein are retrieved by the processor 901 from the program memory in the form of signals. Location of the instructions in the program memory is determined by a program counter (PC). The program counter stores a number that identifies the current position in the program of the computer implemented method disclosed herein.

The instructions fetched by the processor 901 from the program memory after being processed, are decoded. After processing and decoding, the processor 901 executes the instructions. For example, the grid layer generation engine 805 defines instructions for generating one or more grid layers, the metadata acquisition module 806 defines instructions for extracting metadata from predefined content criteria, the validation module 807 defines instructions for validating the acquired metadata using a predefined set of metadata stored in the metadata database 301, the lattice creation module 808 defines instructions for creating a multi-dimensional virtual lattice 302 comprising the generated grid layers, the content retrieval module 809 defines instructions for retrieving electronic content from multiple content sources 804, the graphical representation creation module 810 defines instructions for graphically representing the retrieved electronic content within the created multi-dimensional virtual lattice 302, the artifact association module 811 defines instructions for attaching each of the content artifacts from the acquired electronic content to one or more nodes of the created multi-dimensional virtual lattice 302, the identification engine 812 defines instructions for uniquely identifying each of the content artifacts using unique identifiers assigned by the artifact database 303, the artifact association module 811 defines instructions for graphically representing associations between each of the identified content artifacts within the created multi-dimensional virtual lattice 302 using the acquired metadata, the artifact extraction module 813 defines instructions for extracting content artifacts from the multi-dimensional virtual lattice 302, etc. The defined instructions are stored in the program memory.

The processor 901 retrieves the instructions defined by the grid layer generation engine 805, the metadata acquisition module 806, the validation module 807, the lattice creation module 808, the content retrieval module 809, the graphical representation creation module 810, the artifact association module 811, the metadata database 301 the identification engine 812, and the artifact extraction module 813 and executes the instructions.

Consider an example where a user 801 wishes to extract electronic content pertaining to, for example, a branch of science, physics. The user 801 provides user defined content criteria, for example, domain criteria, standards criteria, pedagogic criteria, parametric criteria, etc. using the GUI 802. A multi-dimensional virtual lattice 302 comprising the foundation grid layer, the standards grid layer, the pedagogical layer, and the parametric grid layer are generated as disclosed in the detailed description of FIG. 2. The nodes of the created multi-dimensional virtual lattice 302 represent metadata acquired from the predefined content criteria.

Electronic content comprising content artifacts, for example, multiple physics chapters, are acquired from multiple content sources 804 via the network 803. The acquired electronic content is mapped within the created multi-dimensional virtual lattice 302 and the content artifacts attach to one or more nodes of the multi-dimensional virtual lattice 302.

Figure 10:
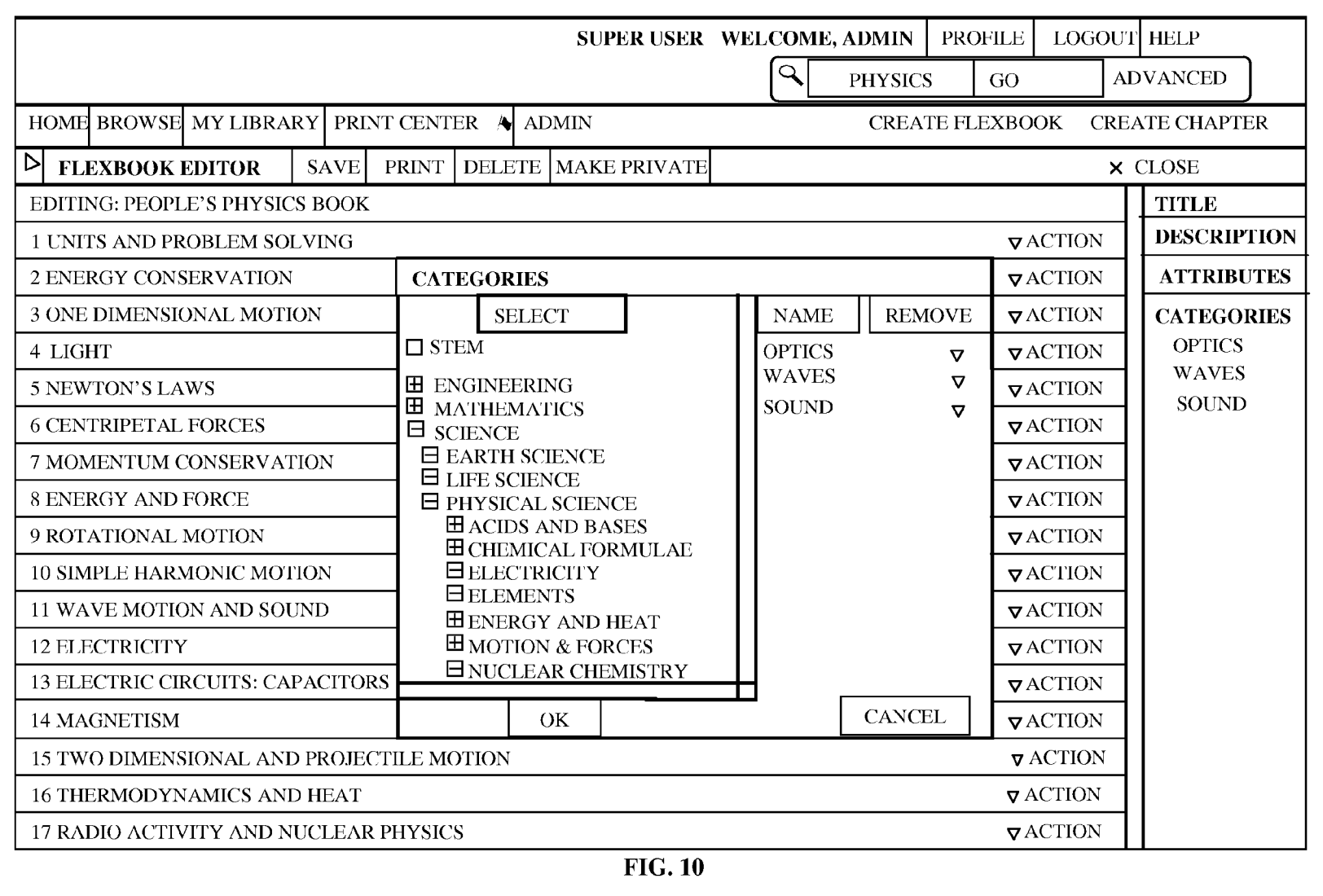

FIG. 10 exemplarily illustrates association of content artifacts using the foundation grid layer. As exemplarily illustrated in FIG. 10, the domain "science" is fragmented into topics, for example, "earth science", "life science", "physical science", etc. and subtopics related to the topics, for example, "acids and bases", "chemical formulae", "elements", "electricity", "motion and forces", "Gravitational Force", and "Reflection, Refraction, Dispersion, Total Internal Reflection", etc. A screenshot of the GUI provided to a user 801 for selecting categories and domains for graphically representing electronic content is exemplarily illustrated in FIG. 10. The user 801 defines domain criteria using the GUI exemplarily illustrated in FIG. 10. In an example, the user 801 categorizes the chapters of a physics book using the GUI illustrated in FIG. 10 for graphically representing the chapters based on domains on the multi-dimensional virtual lattice 302.

Figure 11:
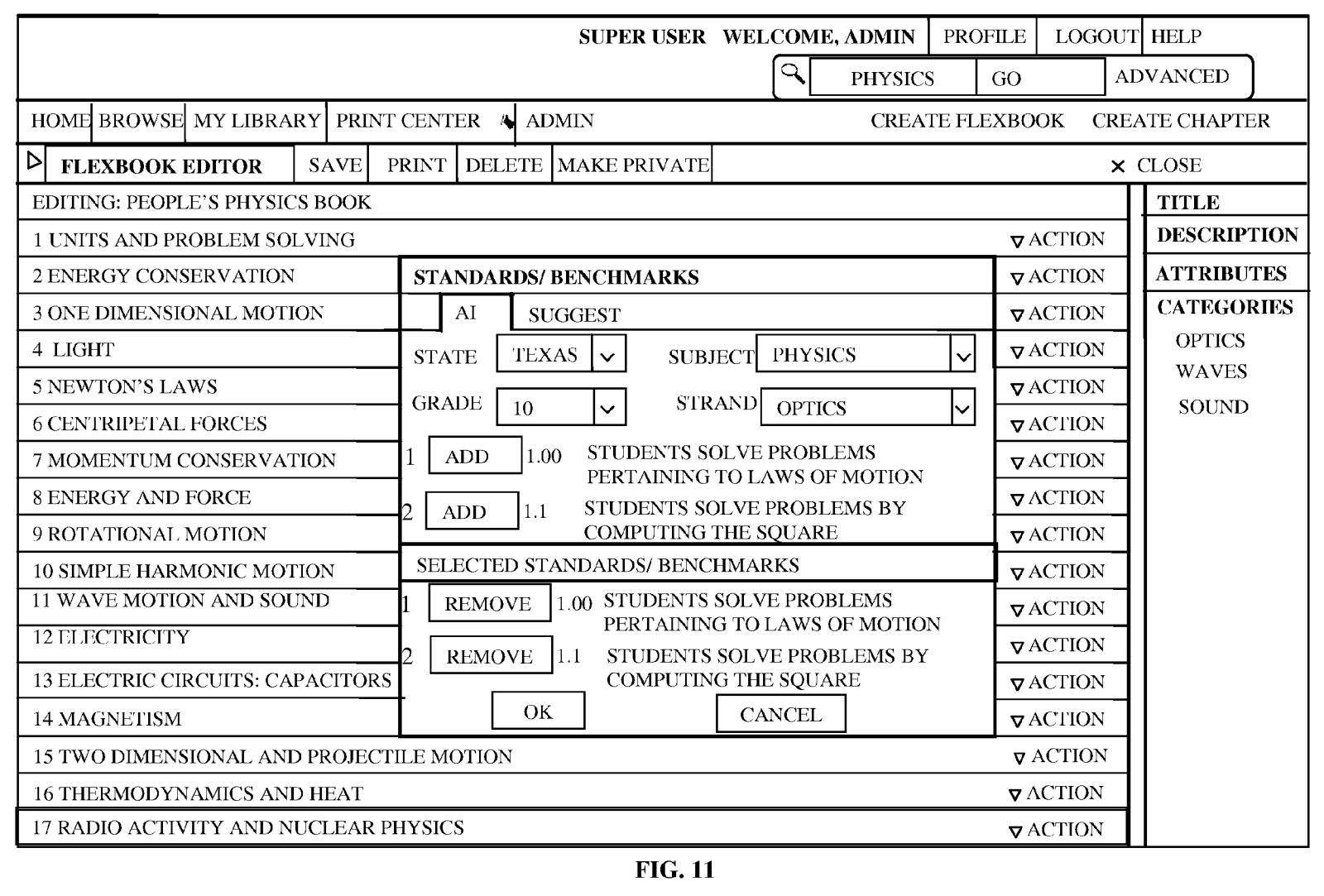

FIG. 11 exemplarily illustrates association of content artifacts using the standards grid layer. A screenshot of the GUI provided to a user 801 for defining standards and benchmarks is exemplarily illustrated in FIG. 11. For example, for a chapter of the physics book, the user 801 defines the standards, for example, "state Texas", "10th grade", and "optics strand". The chapters of the physics book are then mapped onto the multi-dimensional virtual lattice 302 using the standards grid layer based on the defined standards.

FIG. 12 exemplarily illustrates association of content artifacts using the pedagogical grid layer. A screenshot of the GUI provided to a user 801 for defining pedagogic criteria, for example, difficulty level, advancement level, etc. is exemplarily illustrated in FIG. 12. The user 801 maps the chapters from the acquired electronic content based on the pedagogic criteria, for example, the difficulty level and the advancement level, on to the created multi-dimensional virtual lattice 302 using the pedagogical grid layer.

FIG. 13 exemplarily illustrates association of content artifacts using the parametric grid layer. The user 801 may edit tags, for example, "Physics", "Newton's Laws", "Motion", "Light", etc. that may be used as metadata that represents one or more nodes in the created multi-dimensional virtual lattice 302. A screenshot of the GUI provided to a user 801 for editing tags is exemplarily illustrated in FIG. 13. Chapters of the physics book attach to one or more nodes within the created multi-dimensional virtual lattice 302 based on matching metadata coordinates. The acquired electronic content is therefore graphically represented within the created multi-dimensional virtual lattice 302 using the grid layers.

Figure 14:
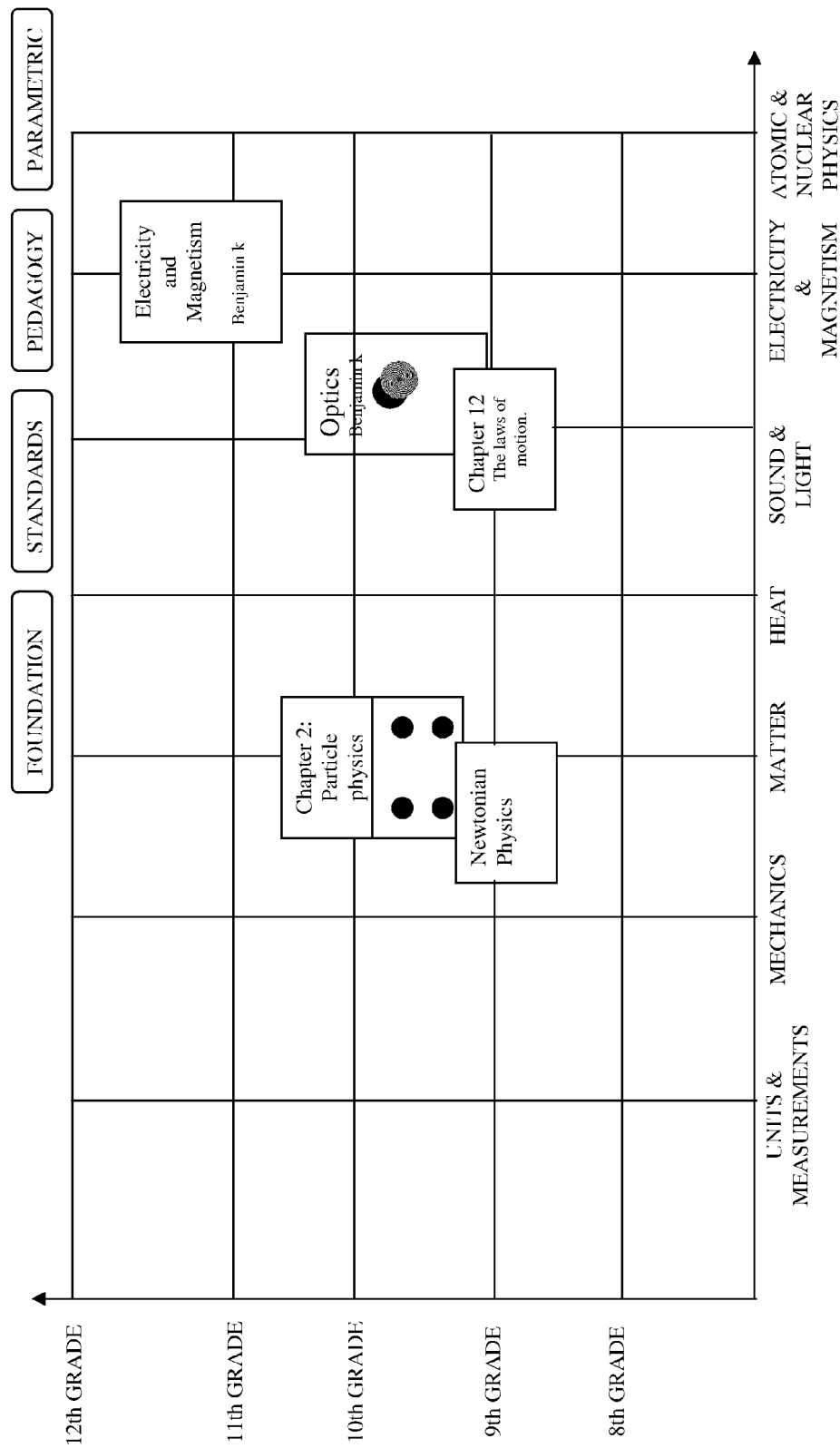
FIG. 14 exemplarily illustrates a graphical representation of acquired electronic content within a created multi-dimensional virtual lattice using grid layers.

FIG. 14 exemplarily illustrates a graphical representation of acquired electronic content within a created multi-dimensional virtual lattice 302 using the grid layers. A user 801 may use search criteria to extract specific physics chapters from the graphical representation of electronic content. For example, in FIG. 14, the content artifacts are chapters pertaining to "High School Physics". In this example, the chapter "Electricity and Magnetism" is mapped onto a node on the multi-dimensional virtual lattice 302 defined by virtual coordinates determined from the content metadata "Electricity and Magnetism" and "$11^{th}$ Grade" of the chapter. Similarly, the chapter "Particle Physics" is mapped onto a node on the multi-dimensional virtual lattice 302 defined by virtual coordinates determined from the content metadata "Matter" and "$10^{th}$ Grade" of the chapter. The chapter "Newtonian Physics" is mapped onto a node on the multi-dimensional virtual lattice 302 defined by virtual coordinates determined from the content metadata "Matter" and "$9^{th}$ Grade" of the chapter. The chapter "Optics" is mapped onto a node on the multi-dimensional virtual lattice 302 defined by virtual coordinates determined from the content metadata "Sound and Light" and "$10^{th}$ Grade" of the chapter.

Each content artifact may have an unbounded number of content metadata associated with the content artifact. For example, a chapter on "Light" may have, for example, "Physics", "High School (HS)", and "California $9^{th}$ grade (CA 9)" etc. as content metadata associated with the chapter. Virtual coordinates may be determined from any two or more of the content metadata.

It will be readily apparent that the various methods and algorithms described herein may be implemented in a computer readable medium appropriately programmed for general purpose computers and computing devices. Typically a processor, for example, one or more microprocessors will receive instructions from a memory or like device, and execute those instructions, thereby performing one or more processes defined by those instructions. Further, programs that implement such methods and algorithms may be stored and transmitted using a variety of media, for example, computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer readable programs may be implemented in any programming language. Some examples of languages that can be used include C, C++, C#, Python, or JAVA. The software programs may be stored on or in one or more mediums as an object code. A computer program product comprising computer executable instructions embodied in a computer readable medium comprises computer parsable codes for the implementation of the processes of various embodiments.

Where databases are described, such as the metadata database 301 and the artifact database 303, it will be understood by one of ordinary skill in the art that (i) alternative database structures to those described is readily employed, and (ii) other memory structures besides databases is readily employed. Any illustrations or descriptions of any sample databases presented herein are illustrative arrangements for stored representations of information. Any number of other arrangements is employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, Sun® processors, IBM® processors etc., that are adapted to communicate with the computer. Any number and type of machines is in communication with the computer.

The foregoing examples have been provided merely for the purpose of explanation and are in no way to be construed as limiting of the present invention. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A computer implemented method of associating and extracting a plurality of content artifacts from a graphical representation of electronic content, comprising:
    creating a multi-dimensional virtual lattice comprising a plurality grid layers generated based on predefined content criteria, wherein nodes of said created multi-dimensional virtual lattice represent metadata acquired from said predefined content criteria, wherein said grid layers comprise:
        a foundation grid layer for representing said content artifacts based on domains;
        a standards grid layer overlaid on said foundation grid layer for logically representing said content artifacts based on a curriculum and state standards framework;
        a pedagogical grid layer overlaid on one or more of said standards grid layer and said foundation grid layer for pedagogically representing said content artifacts; and
        a parametric grid layer overlaid on said pedagogical grid layer for parametrically representing said content artifacts based on user defined attributes and a set of ad hoc representation parameters;
    graphically representing said electronic content comprising content artifacts acquired from a plurality of content sources within said created multi-dimensional virtual lattice using said grid layers, wherein each of said content artifacts from said electronic content attaches to one or more of said nodes of said created multi-dimensional virtual lattice;
    receiving search criteria comprising keywords from a user; and
    selectively extracting content artifacts attached to nodes of said created multi-dimensional virtual lattice by matching metadata with said keywords in said search criteria, wherein said grid layers enable selective extraction of said content artifacts.

2. The computer implemented method of claim 1, wherein said predefined content criteria comprise domain criteria, standards criteria, pedagogic criteria, parametric criteria, demographic criteria, chronology criteria, and format criteria.

3. The computer implemented method of claim 1, wherein each of said content artifacts attaches to said one or more of said nodes of said created multi-dimensional virtual lattice based on explicit definition provided by said user and implicit matching using said metadata.

4. The computer implemented method of claim 1, further comprising acquiring implicit metadata and explicit metadata from said search criteria, said electronic content, and said predefined content criteria for associating said content artifacts that are graphically represented within said created multi-dimensional virtual lattice, wherein said acquired metadata is stored in a metadata database.

5. The computer implemented method of claim 4, further comprising representing said associations between said content artifacts within said created multi-dimensional virtual lattice using said acquired metadata.

6. The computer implemented method of claim 1, further comprising providing a graphical user interface for acquiring said search criteria, said metadata, and said predefined content criteria.

7. The computer implemented method of claim 1, further comprising uniquely identifying said content artifacts attached to said nodes of said created multi-dimensional virtual lattice using a plurality of identifiers assigned by an artifact database.

8. A computer implemented system for associating and extracting a plurality of content artifacts from a graphical representation of electronic content, comprising:
    a storage device comprising a non-transitory computer-readable medium in communication with one or more processors and storing instructions configured to be executed by said processors configured to implement:
        a grid layer generation engine that generates a plurality of grid layers based on predefined content criteria, wherein said grid layers comprise:
            a foundation grid layer for representing said content artifacts based on domains;
            a standards grid layer overlaid on said foundation grid layer for logically representing said content artifacts based on a curriculum and state standards framework
            a pedagogical grid layer overlaid on one or more of said standards grid layer and said foundation grid layer for pedagogically representing said content artifacts; and
            a parametric grid layer overlaid on said pedagogical grid layer for parametrically representing said content artifacts based on user defined attributes and a set of ad hoc representation parameters;

a lattice creation module that creates a multi-dimensional virtual lattice comprising said generated grid layers, wherein nodes of said created multi-dimensional virtual lattice represent metadata acquired from said predefined content criteria;

a graphical representation creation module that graphically represents said electronic content comprising content artifacts acquired from a plurality of content sources within said created multi-dimensional virtual lattice using said generated grid layers, wherein each of said content artifacts from said electronic content attaches to one or more of said nodes of said created multi-dimensional virtual lattice;

an artifact extraction module that selectively extracts content artifacts attached to nodes of said created multi-dimensional virtual lattice by matching metadata with keywords in search criteria received from a user, wherein said grid layers enable selective extraction of said content artifacts; and a graphical user interface for acquiring said search criteria, said metadata, and said predefined content criteria.

9. The computer implemented system of claim 8, further comprising a metadata acquisition module that acquires implicit metadata and explicit metadata from said search criteria, said electronic content, and said predefined content criteria for associating said content artifacts that are graphically represented within said created multi-dimensional virtual lattice, wherein said acquired metadata is stored in a metadata database.

10. The computer implemented system of claim 9, further comprising a validation module that validates said acquired metadata using a predefined set of metadata stored in said metadata database.

11. The computer implemented system of claim 8, further comprising an artifact association module that attaches said content artifacts to said one or more of said nodes of said created multi-dimensional virtual lattice based on explicit definition provided by said user and implicit matching using said metadata.

12. The computer implemented system of claim 11, wherein said artifact association module represents associations between said content artifacts within said created multi-dimensional virtual lattice using said acquired metadata.

13. The computer implemented system of claim 8, further comprising an identification engine that uniquely identifies said content artifacts attached to said nodes of said created multi-dimensional virtual lattice using a plurality of identifiers assigned by an artifact database.

14. A computer program product comprising a non-transitory computer-readable storage medium having computer readable program code embodied thereon, said computer-readable program code comprising:

a first computer readable program code for generating a plurality of grid layers based on predefined content criteria, wherein said grid layers comprise:

a foundation grid layer for representing said content artifacts based on domains;

a standards grid layer overlaid on said foundation grid layer for logically representing said content artifacts based on a curriculum and state standards framework;

a pedagogical grid layer overlaid on one or more of said standards grid layer and said foundation grid layer for pedagogically representing said content artifacts; and a parametric grid layer overlaid on said pedagogical grid layer for parametrically representing said content artifacts based on user defined attributes and a set of ad hoc representation parameters;

a second computer readable program code for creating a multi-dimensional virtual lattice comprising said generated grid layers;

a third computer readable program code for graphically representing electronic content comprising content artifacts acquired from a plurality of content sources within said created multi-dimensional virtual lattice using said generated grid layers, wherein each of said content artifacts from said electronic content attaches to one or more of said nodes of said created multi-dimensional virtual lattice;

a fourth computer readable program code for receiving search criteria comprising keywords from a user; and a fifth computer readable program code for selectively extracting content artifacts attached to nodes of said created multi-dimensional virtual lattice by matching metadata with said keywords in said search criteria, wherein said grid layers enable selective extraction of said content artifacts.

15. The computer program product of claim 14, further comprising a sixth computer readable program code for acquiring implicit metadata and explicit metadata from said search criteria, said electronic content, and said predefined content criteria for associating said content artifacts graphically represented within said created multi-dimensional virtual lattice.

16. The computer program product of claim 15, further comprising a seventh computer readable program code for representing associations of said content artifacts within said created multi-dimensional virtual lattice using said acquired metadata, wherein said associations are performed based on explicit definition provided by said user and implicit matching using said metadata.

17. The computer program product of claim 14, further comprising an eighth computer readable program code for uniquely identifying said content artifacts attached to said nodes of said created multi-dimensional virtual lattice using a plurality of identifiers assigned by an artifact database.

* * * * *